US012596516B2

(12) United States Patent
Edelsohn et al.

(10) Patent No.: US 12,596,516 B2
(45) Date of Patent: Apr. 7, 2026

(54) ADAPTIVE SYNCHRONIZATION OF OBJECTS IN A DISTRIBUTED METAVERSE

(71) Applicant: International Business Machines Corporation, Armonk, NY (US)

(72) Inventors: David Joel Edelsohn, White Plains, NY (US); Dinesh C. Verma, New Castle, NY (US); Dan Gutfreund, Brighton, MA (US); Shahrokh Daijavad, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 18/401,978

(22) Filed: Jan. 2, 2024

(65) Prior Publication Data

US 2025/0217095 A1     Jul. 3, 2025

(51) Int. Cl.
*G06F 3/14* (2006.01)
*G06F 3/01* (2006.01)

(52) U.S. Cl.
CPC ............ *G06F 3/1454* (2013.01); *G06F 3/011* (2013.01)

(58) Field of Classification Search
CPC ...... G06F 3/1454; G06F 3/011; A63F 13/352; A63F 13/77; A63F 2300/513
USPC .......................................................... 463/1
See application file for complete search history.

(56) References Cited

U.S. PATENT DOCUMENTS 8,503,925 B2     8/2013 Chapin
8,864,583 B1     10/2014 Lotzer
10,799,792 B2     10/2020 Rios
11,027,198 B2      6/2021 Perry et al.
11,178,373 B2     11/2021 Varerkar et al.
11,507,733 B2     11/2022 Shuster et al.
12,383,824 B2 *    8/2025 Benedetto ............... A63F 13/77
2010/0070807 A1     3/2010 Hamilton et al.
2010/0083140 A1     4/2010 Dawson et al.
2013/0283191 A1     10/2013 Finn et al.
2013/0311361 A1     11/2013 Boss et al.

(Continued)

FOREIGN PATENT DOCUMENTS

CN     110784703 A     2/2020
FR      3003717 A1 *    9/2014     ......... H04L 12/1822

OTHER PUBLICATIONS

Machine translation of FR-3003717-A1 (Year: 2014).*

(Continued)

*Primary Examiner* — Allen Chan
(74) *Attorney, Agent, or Firm* — Yee & Associates, P.C.

(57)     ABSTRACT

Adaptive synchronization of objects in a distributed metaverse is provided. An agent of a user of a global metaverse is detected performing an action on an object within a scene of a local metaverse corresponding to the user. A state change in the object caused by the action performed by the agent of the user in a local context of the local metaverse corresponding to the user is stored. It is determined whether the action performed by the agent on the object is globally observable or an irreversible action. The state change in the object caused by the action performed by the agent of the user in the local context of the local metaverse corresponding to the user is propagated to a plurality of different local metaverses of the global metaverse in response to determining that the action performed by the agent is globally observable or an irreversible action.

20 Claims, 7 Drawing Sheets

(56) References Cited

U.S. PATENT DOCUMENTS

| | | | |
|---|---|---|---|
| 2016/0062444 A1 | 3/2016 | Hamilton et al. | |
| 2022/0096933 A1 | 3/2022 | Raymond | |
| 2022/0182592 A1 | 6/2022 | Varerkar et al. | |
| 2024/0329793 A1* | 10/2024 | Magi | G06F 3/04815 |

OTHER PUBLICATIONS

Pixar, "Universal Scene Description," Copyright 2021, 2 pages, Pixar Animation Studios, accessed Dec. 1, 2023, https://openusd. org/release/index.html#.
Plumb, "Universal Scene Description: The HTML of the metaverse," Venture Beat, Sep. 22, 2022, 8 pages, accessed Nov. 28, 2023, https://venturebeat.com/virtual/universal-scene-description-the-html-of-the-metaverse/.

* cited by examiner

COMPUTING ENVIRONMENT
100

FIG. 1

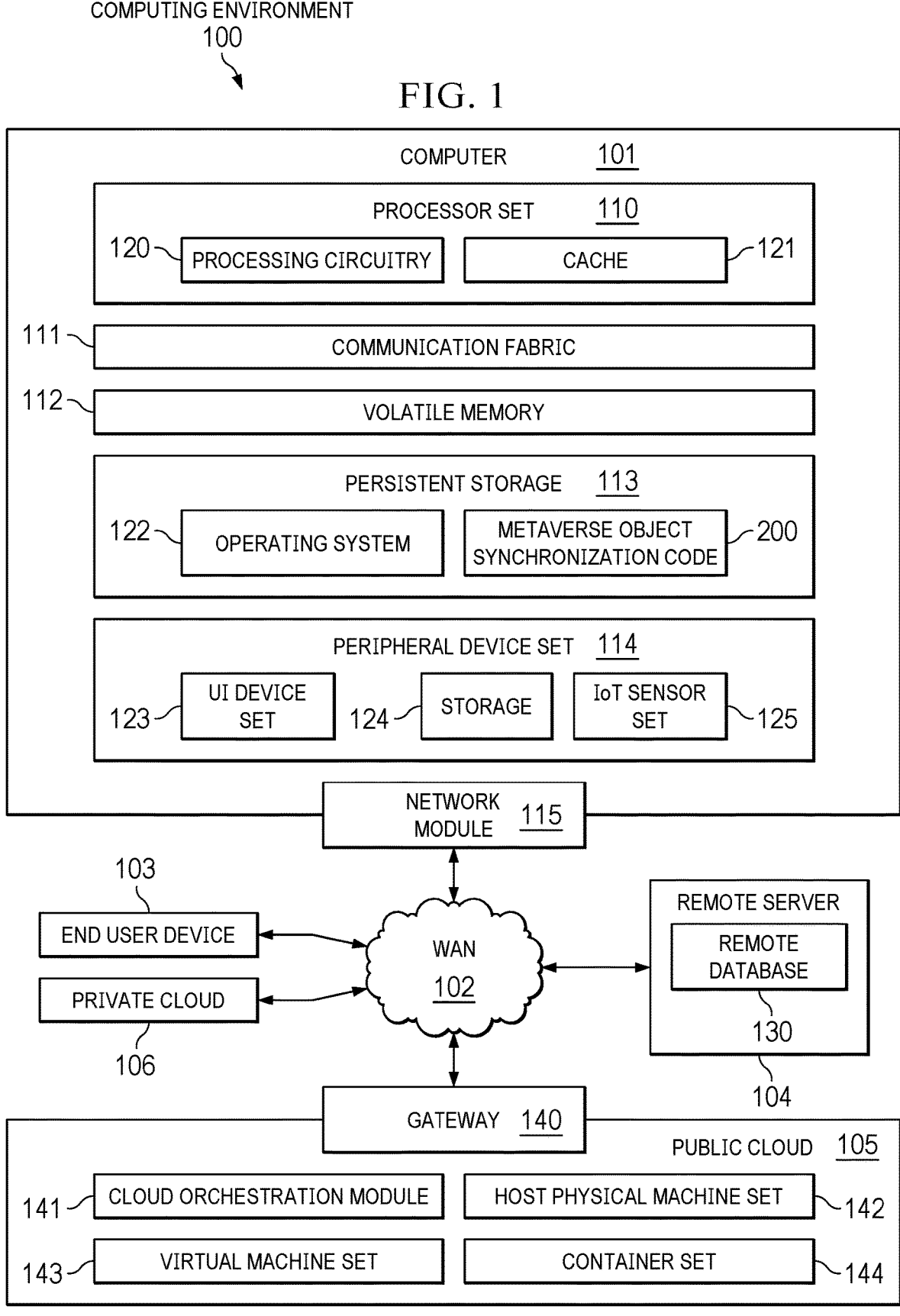

COMPUTER          101

PROCESSOR SET          110

120 — PROCESSING CIRCUITRY          CACHE — 121

111 — COMMUNICATION FABRIC

112 — VOLATILE MEMORY

PERSISTENT STORAGE          113

122 — OPERATING SYSTEM          METAVERSE OBJECT SYNCHRONIZATION CODE — 200

PERIPHERAL DEVICE SET          114

123 — UI DEVICE SET          124 — STORAGE          IoT SENSOR SET — 125

NETWORK MODULE          115

103

END USER DEVICE

PRIVATE CLOUD

106

WAN          102

REMOTE SERVER

REMOTE DATABASE

130

104

GATEWAY          140

PUBLIC CLOUD          105

141 — CLOUD ORCHESTRATION MODULE          HOST PHYSICAL MACHINE SET — 142

143 — VIRTUAL MACHINE SET          CONTAINER SET — 144

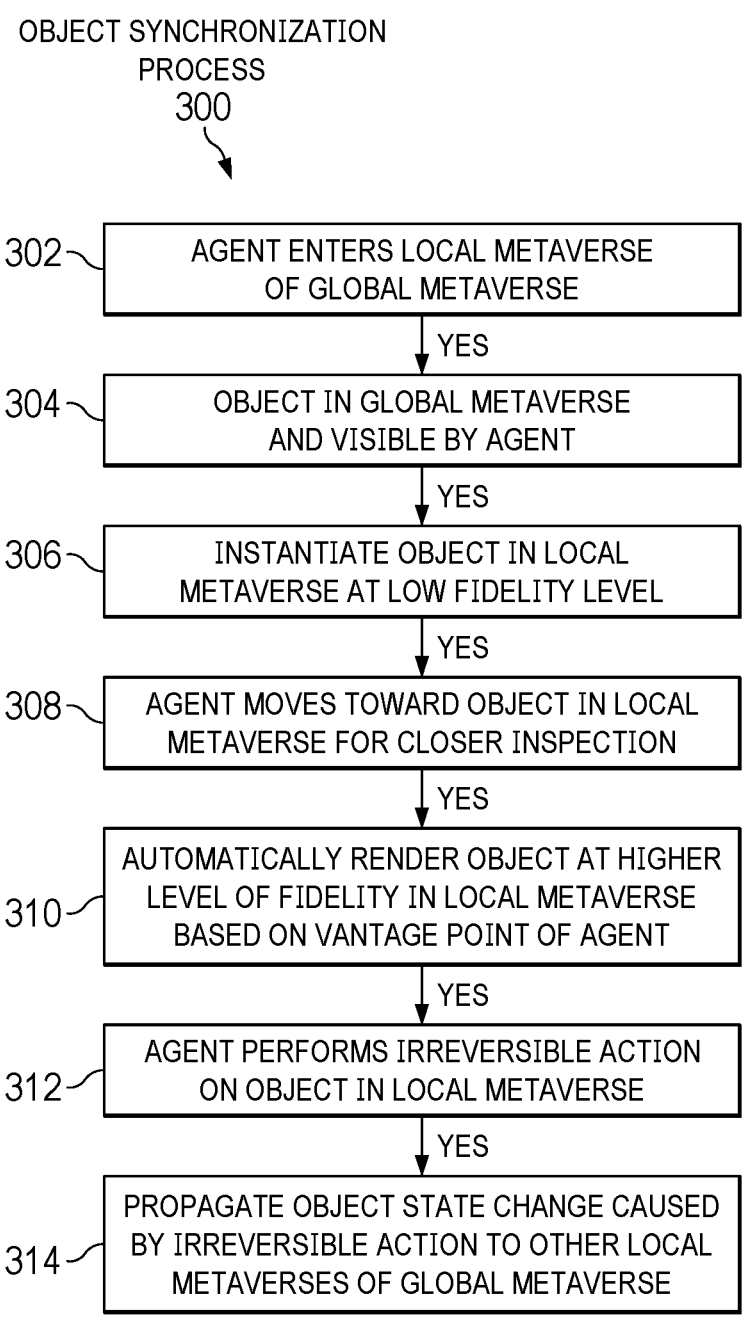

OBJECT SYNCHRONIZATION
PROCESS
300

302 — AGENT ENTERS LOCAL METAVERSE
OF GLOBAL METAVERSE

YES

304 — OBJECT IN GLOBAL METAVERSE
AND VISIBLE BY AGENT

YES

306 — INSTANTIATE OBJECT IN LOCAL
METAVERSE AT LOW FIDELITY LEVEL

YES

308 — AGENT MOVES TOWARD OBJECT IN LOCAL
METAVERSE FOR CLOSER INSPECTION

YES

310 — AUTOMATICALLY RENDER OBJECT AT HIGHER
LEVEL OF FIDELITY IN LOCAL METAVERSE
BASED ON VANTAGE POINT OF AGENT

YES

312 — AGENT PERFORMS IRREVERSIBLE ACTION
ON OBJECT IN LOCAL METAVERSE

YES

314 — PROPAGATE OBJECT STATE CHANGE CAUSED
BY IRREVERSIBLE ACTION TO OTHER LOCAL
METAVERSES OF GLOBAL METAVERSE

FIG. 3

ADAPTIVE SYNCHRONIZATION OF OBJECTS IN A DISTRIBUTED METAVERSE

BACKGROUND

The disclosure relates generally to metaverses and more specifically to objects in a metaverse.

The metaverse provides immersive three-dimensional virtual spaces where people can, for example, socialize, work, shop, learn, interact, explore, and the like with each other while at different physical locations. The metaverse can provide visual objects, sound, and other sensory input corresponding to real world settings to enhance user experience. Access points to the metaverse include computers, smartphones, augmented reality devices, mixed reality devices, virtual reality devices, and the like. Digital renderings of humans, avatars, agents, or the like, which represent users of the metaverse, move freely from one scene or experience to another in the metaverse.

SUMMARY

According to one illustrative embodiment, a computer-implemented method for adaptive synchronization of objects in a distributed metaverse is provided. A computer detects that an agent of a user of a global metaverse is performing an action on an object within a scene of a local metaverse corresponding to the user while the agent is experiencing the object. The computer stores a state change in the object caused by the action performed by the agent of the user in a local context of the local metaverse corresponding to the user. The computer determines whether the action performed by the agent on the object is at least one of globally observable by other agents in the scene within other local metaverses or is an irreversible action that is permitted by one or more policies of the global metaverse for the object. The computer propagates the state change in the object caused by the action performed by the agent of the user in the local context of the local metaverse corresponding to the user to a plurality of different local metaverses of the global metaverse in response to the computer determining that the action performed by the agent on the object is at least one of globally observable by the other agents in the scene or is an irreversible action that is permitted by one or more policies of the global metaverse for the object. According to other illustrative embodiments, a computer system and computer program product for adaptive synchronization of objects in a distributed metaverse are provided.

BRIEF DESCRIPTION OF THE DRAWINGS

FIG. 1 is a pictorial representation of a computing environment in which illustrative embodiments may be implemented;

FIG. 3 is a diagram illustrating an example of an object synchronization process in accordance with an illustrative embodiment;

DETAILED DESCRIPTION

Figure 2:
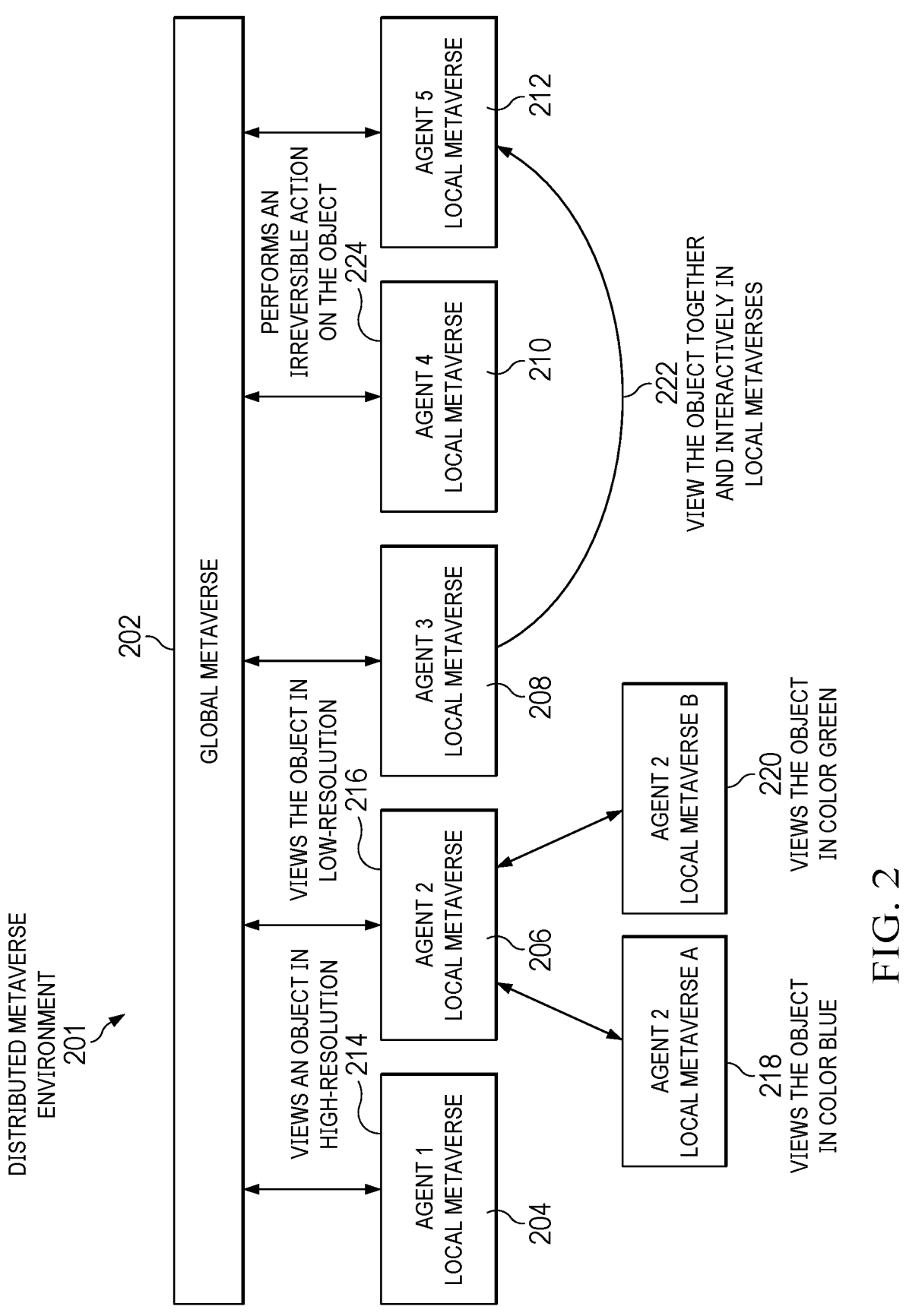
FIG. 2 is a diagram illustrating an example of a distributed metaverse environment in accordance with an illustrative embodiment.

A computer-implemented method provides adaptive synchronization of objects in a distributed metaverse. A computer detects that an agent of a user of a global metaverse is performing an action on an object within a scene of a local metaverse corresponding to the user while the agent is experiencing the object. The computer stores a state change in the object caused by the action performed by the agent of the user in a local context of the local metaverse corresponding to the user. The computer determines whether the action performed by the agent on the object is at least one of globally observable by other agents in the scene within other local metaverses or is an irreversible action that is permitted by one or more policies of the global metaverse for the object. The computer propagates the state change in the object caused by the action performed by the agent of the user in the local context of the local metaverse corresponding to the user to a plurality of different local metaverses of the global metaverse in response to the computer determining that the action performed by the agent on the object is at least one of globally observable by the other agents in the scene or is an irreversible action that is permitted by one or more policies of the global metaverse for the object. As a result, illustrative embodiments provide a technical effect of deferring the attainment of data consistency between a plurality of different local metaverses comprising a global metaverse to achieve increased system performance by not globally propagating all object state changes occurring in different local metaverses until an object state change is at least one of irreversible or globally observable.

The computer also prevents propagation of the state change in the object caused by the action performed by the agent to the plurality of different local metaverses of the global metaverse in response to the computer determining that the action performed by the agent on the object is not globally observable by the other agents in the scene and is not an irreversible action that is permitted by one or more policies of the global metaverse for the object. As a result, illustrative embodiments provide a technical effect of not propagating object state changes caused by agent actions in local metaverses to other local metaverses of the global metaverse when those object state changes are not globally observable or irreversible.

In addition, the computer determines whether the agent of the user is performing another action on the object. The computer deletes the state change in the object caused by the action performed by the agent of the user in the local context of the local metaverse corresponding to the user in response to the computer determining that the agent of the user is not performing another action on the object. As a result, illustrative embodiments provide a technical effect of deleting object state changes of local metaverses when agents of the users are no longer performing reversible actions on objects in their corresponding local metaverses saving resources.

Further, the computer receives an indication that the user entered the global metaverse using a local client device corresponding to the user. The global metaverse is comprised of the plurality of different local metaverses, where each respective local metaverse of the plurality of different local metaverses corresponds to a different user who is digitally represented by an individualized agent in a corresponding local metaverse. The computer generates the local metaverse corresponding to the user on the local client device in response to the user entering the global metaverse. The local metaverse corresponding to the user is one of the plurality of different local metaverses comprising the global metaverse. The computer detects that the agent of the user is moving within the scene of the local metaverse corresponding to the user. As a result, illustrative embodiments provide a technical effect of generating the local metaverse corresponding to the user on the local client device of the user in response to the user entering the global metaverse and detecting movement of the agent within the scene of the local metaverse corresponding to the user.

Furthermore, the computer determines whether the agent of the user is experiencing the object in the global metaverse and instantiates the object in the local metaverse corresponding to the user in a shared state such that the other agents within the scene within the other local metaverses can experience the object as well in response to the computer determining that the agent of the user is experiencing the object in the global metaverse. As a result, illustrative embodiments provide a technical effect of sharing object state among local metaverses of agents within a particular scene in order for the agents in other local metaverses to individually experience the objects as well.

Moreover, the computer detects that the agent of the user is moving toward the object within the scene of the local metaverse corresponding to the user, detects a current position of the agent of the user in relation to the object within the scene of the local metaverse corresponding to the user as the agent moves closer to the object, and increases a level of fidelity of the object within the scene of the local metaverse corresponding to the user automatically based on the current position of the agent as the agent experiences the object. As a result, illustrative embodiments provide a technical effect of automatically increasing the level of fidelity of objects within scenes of local metaverses based on current positions (e.g., vantage points) of agents within their corresponding local metaverses as the agents individually experience the objects.

In addition, the computer detects that the agent of the user is experiencing an additional characteristic of the object or transformation of the object while performing the action and increases a level of fidelity of the object within the scene of the local metaverse corresponding to the user automatically based on the additional characteristic of the object experienced by the agent of the user and fidelity of the object needed for the agent to perform the action or perceive the additional characteristic. As a result, illustrative embodiments provide a technical effect of automatically increasing the level of fidelity of an object within a scene of the local metaverse corresponding to the user based on an additional characteristic of the object being experienced by the agent of the user and fidelity of the object needed for the agent to perform the action or perceive the additional characteristic.

A computer system for adaptive synchronization of objects in a distributed metaverse comprises a communication fabric, a set of computer-readable storage media connected to the communication fabric, where the set of computer-readable storage media stores program instructions, and a set of processors connected to the communication fabric, where the set of processors executes the program instructions. The computer system detects that an agent of a user of a global metaverse is performing an action on an object within a scene of a local metaverse corresponding to the user while the agent is experiencing the object. The computer system stores a state change in the object caused by the action performed by the agent of the user in a local context of the local metaverse corresponding to the user. The computer system determines whether the action performed by the agent on the object is at least one of globally observable by other agents in the scene within other local metaverses or is an irreversible action that is permitted by one or more policies of the global metaverse for the object. The computer system propagates the state change in the object caused by the action performed by the agent of the user in the local context of the local metaverse corresponding to the user to a plurality of different local metaverses of the global metaverse in response to the computer system determining that the action performed by the agent on the object is at least one of globally observable by the other agents in the scene or is an irreversible action that is permitted by one or more policies of the global metaverse for the object. As a result, illustrative embodiments provide a technical effect of deferring the attainment of data consistency between a plurality of different local metaverses comprising a global metaverse to achieve increased system performance by not globally propagating all object state changes occurring in different local metaverses until an object state change is at least one of irreversible or globally observable.

The computer system also prevents propagation of the state change in the object caused by the action performed by the agent to the plurality of different local metaverses of the global metaverse in response to the computer system determining that the action performed by the agent on the object is not globally observable by the other agents in the scene and is not an irreversible action that is permitted by one or more policies of the global metaverse for the object. As a result, illustrative embodiments provide a technical effect of not propagating object state changes caused by agent actions in local metaverses to other local metaverses of the global metaverse when those object state changes are not globally observable or irreversible.

In addition, the computer system determines whether the agent of the user is performing another action on the object. The computer system deletes the state change in the object caused by the action performed by the agent of the user in the local context of the local metaverse corresponding to the user in response to the computer system determining that the agent of the user is not performing another action on the object. As a result, illustrative embodiments provide a technical effect of deleting object state changes of local metaverses when agents of the users are no longer performing reversible actions on objects in their corresponding local metaverses saving resources.

Further, the computer system receives an indication that the user entered the global metaverse using a local client device corresponding to the user. The global metaverse is comprised of the plurality of different local metaverses, where each respective local metaverse of the plurality of different local metaverses corresponds to a different user who is digitally represented by an individualized agent in a corresponding local metaverse. The computer system generates the local metaverse corresponding to the user on the local client device in response to the user entering the global metaverse. The local metaverse corresponding to the user is one of the plurality of different local metaverses comprising the global metaverse. The computer system detects that the agent of the user is moving within the scene of the local metaverse corresponding to the user. As a result, illustrative embodiments provide a technical effect of generating the local metaverse corresponding to the user on the local client device of the user in response to the user entering the global metaverse and detecting movement of the agent within the scene of the local metaverse corresponding to the user.

Furthermore, the computer system determines whether the agent of the user is experiencing the object in the global metaverse and instantiates the object in the local metaverse corresponding to the user in a shared state such that the other agents within the scene within the other local metaverses can experience the object as well in response to the computer system determining that the agent of the user is experiencing the object in the global metaverse. As a result, illustrative embodiments provide a technical effect of sharing object state among local metaverses of agents within a particular scene in order for the agents in other local metaverses to individually experience the objects as well.

Moreover, the computer system detects that the agent of the user is moving toward the object within the scene of the local metaverse corresponding to the user, detects a current position of the agent of the user in relation to the object within the scene of the local metaverse corresponding to the user as the agent moves closer to the object, and increases a level of fidelity of the object within the scene of the local metaverse corresponding to the user automatically based on the current position of the agent as the agent experiences the object. As a result, illustrative embodiments provide a technical effect of automatically increasing the level of fidelity of objects within scenes of local metaverses based on current positions (e.g., vantage points) of agents within their corresponding local metaverses as the agents individually experience the objects.

A computer program product adaptive synchronization of objects in a distributed metaverse comprises a set of computer-readable storage media having program instructions collectively stored therein, the program instructions executable by a computer. The computer detects that an agent of a user of a global metaverse is performing an action on an object within a scene of a local metaverse corresponding to the user while the agent is experiencing the object. The computer stores a state change in the object caused by the action performed by the agent of the user in a local context of the local metaverse corresponding to the user. The computer determines whether the action performed by the agent on the object is at least one of globally observable by other agents in the scene within other local metaverses or is an irreversible action that is permitted by one or more policies of the global metaverse for the object. The computer propagates the state change in the object caused by the action performed by the agent of the user in the local context of the local metaverse corresponding to the user to a plurality of different local metaverses of the global metaverse in response to the computer determining that the action performed by the agent on the object is at least one of globally observable by the other agents in the scene or is an irreversible action that is permitted by one or more policies of the global metaverse for the object. As a result, illustrative embodiments provide a technical effect of deferring the attainment of data consistency between a plurality of different local metaverses comprising a global metaverse to achieve increased system performance by not globally propagating all object state changes occurring in different local metaverses until an object state change is at least one of irreversible or globally observable.

The computer also prevents propagation of the state change in the object caused by the action performed by the agent to the plurality of different local metaverses of the global metaverse in response to the computer determining that the action performed by the agent on the object is not globally observable by the other agents in the scene and is not an irreversible action that is permitted by one or more policies of the global metaverse for the object. As a result, illustrative embodiments provide a technical effect of not propagating object state changes caused by agent actions in local metaverses to other local metaverses of the global metaverse when those object state changes are not globally observable or irreversible.

In addition, the computer determines whether the agent of the user is performing another action on the object. The computer deletes the state change in the object caused by the action performed by the agent of the user in the local context of the local metaverse corresponding to the user in response to the computer determining that the agent of the user is not performing another action on the object. As a result, illustrative embodiments provide a technical effect of deleting object state changes of local metaverses when agents of the users are no longer performing reversible actions on objects in their corresponding local metaverses saving resources.

Further, the computer receives an indication that the user entered the global metaverse using a local client device corresponding to the user. The global metaverse is comprised of the plurality of different local metaverses, where each respective local metaverse of the plurality of different local metaverses corresponds to a different user who is digitally represented by an individualized agent in a corresponding local metaverse. The computer generates the local metaverse corresponding to the user on the local client device in response to the user entering the global metaverse. The local metaverse corresponding to the user is one of the plurality of different local metaverses comprising the global metaverse. The computer detects that the agent of the user is moving within the scene of the local metaverse corresponding to the user. As a result, illustrative embodiments provide a technical effect of generating the local metaverse corresponding to the user on the local client device of the user in response to the user entering the global metaverse and detecting movement of the agent within the scene of the local metaverse corresponding to the user.

Furthermore, the computer determines whether the agent of the user is experiencing the object in the global metaverse and instantiates the object in the local metaverse corresponding to the user in a shared state such that the other agents within the scene within the other local metaverses can experience the object as well in response to the computer determining that the agent of the user is experiencing the object in the global metaverse. As a result, illustrative embodiments provide a technical effect of sharing object state among local metaverses of agents within a particular scene in order for the agents in other local metaverses to individually experience the objects as well.

Moreover, the computer detects that the agent of the user is moving toward the object within the scene of the local metaverse corresponding to the user, detects a current position of the agent of the user in relation to the object within the scene of the local metaverse corresponding to the user as the agent moves closer to the object, and increases a level of fidelity of the object within the scene of the local metaverse corresponding to the user automatically based on the current position of the agent as the agent experiences the object. As a result, illustrative embodiments provide a technical effect of automatically increasing the level of fidelity of objects within scenes of local metaverses based on current positions (e.g., vantage points) of agents within their corresponding local metaverses as the agents individually experience the objects.

In addition, the computer detects that the agent of the user is experiencing an additional characteristic of the object or transformation of the object while performing the action and increases a level of fidelity of the object within the scene of the local metaverse corresponding to the user automatically based on the additional characteristic of the object experienced by the agent of the user and fidelity of the object needed for the agent to perform the action or perceive the additional characteristic. As a result, illustrative embodiments provide a technical effect of automatically increasing the level of fidelity of an object within a scene of the local metaverse corresponding to the user based on an additional characteristic of the object being experienced by the agent of the user and fidelity of the object needed for the agent to perform the action or perceive the additional characteristic.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as metaverse object synchronization code 200. For example, metaverse object synchronization code 200 provides dynamic adaptation of object fidelity in a global metaverse based on agent observation and dynamic propagation of state change of the object based on whether the state change of the object is at least one of an irreversible state change in the object or is globally observable by other agents in the global metaverse. The global metaverse includes a plurality of different local metaverses corresponding to a plurality of different agents that represent a plurality of different users of the global metaverse. In other words, each respective local metaverse corresponds to a particular agent representing a particular user of the global metaverse. As used herein, the term "user" not only refers to a human being, but also can refer to any type of entity (e.g., business, company, or the like), as well as another computer system operating the agent. Metaverse object synchronization code 200 automatically increases the fidelity (i.e., level of detail of characteristics, features, attributes, traits, qualities, properties, and the like) of an object within view of a particular agent in the local multiverse corresponding to that particular agent in order for that particular agent to experience the object. Thus, illustrative embodiments provide a global metaverse that is comprised of a plurality of distributed interconnected and communicating local metaverses that do not require a global, public, serialized, self-consistent state.

Metaverse object synchronization code 200 enables interaction and transmutation of objects in local metaverses of the global metaverse by different groups of agents within different scenes of the global metaverse. Metaverse object synchronization code 200 allows multiple agents to exist in the same global metaverse scene while experiencing different objects in that same scene individually within their corresponding local metaverses and potentially being unaware of one another until an agent performs an irreversible action on an object within a corresponding local metaverse that impacts the state of the global metaverse. Metaverse object synchronization code 200 focuses on the scene observable by an agent and the attention level of that agent on a particular object within the agent's local metaverse. In other words, metaverse object synchronization code 200 enables different agents to engage in different, localized experiences in different local metaverses as long as their experiences are self-consistent for an associated, cooperative group of agents within a particular scene of the global metaverse.

In addition, metaverse object synchronization code 200 enables dynamic aggregation of an object with other objects or disaggregation of an object by an agent in a local metaverse based on agent interaction with the object, and communicates the aggregation or disaggregation of objects to the global metaverse only in response to determining that the agent interaction with the object is irreversible or globally observable. As a result, metaverse object synchronization code 200 reduces network communication by determining whether an action performed by an agent on an object in the agent's local metaverse is a reversible action or an irreversible action and only communicating the result of an irreversible action on the object to the global metaverse for other agents in the same scene to observe.

In addition to metaverse object synchronization code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and metaverse object synchronization code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in metaverse object synchronization code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user of the distributed metaverse services provided by computer 101), and may take any of the forms discussed above in connection with computer 101. EUD 103 typically receives helpful and useful data from the operations of computer 101. For example, in a hypothetical case where computer 101 is designed to provide a local metaverse of the global metaverse to the end user, this local metaverse would typically be communicated from network module 115 of computer 101 through WAN 102 to EUD 103. In this way, EUD 103 can display, or otherwise present, the local metaverse of the global metaverse to the end user. In some embodiments, EUD 103 may be a client device, such as thin client, heavy client, mainframe computer, desktop computer, laptop computer, tablet computer, augmented reality device, mixed reality device, virtual reality device, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a metaverse based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A metaverse is a virtual reality space where users can interact with a computer-generated environment and with other users within that environment. For example, users (e.g., consumers, businesses, and the like) of a particular metaverse can perform commercial transactions in an enhanced version of e-commerce.

Current practice is to have a global consistent state in the metaverse that matches the real world situation or context. However, each user can have a different, personalized view of the metaverse based on the user's corresponding agent within the metaverse. The agent can be any type of distinguishing representation that identifies that particular user in the metaverse. In addition, the agent can receive sensory input from the metaverse. Maintaining consistency at all times among all agents is necessary in currently existing metaverses.

However, human perception of an environment requires an observer. Computer vision needs an embodied observer to interpret the observer's input. Some optical illusions rely on human assumptions about the geometry and composition of the real world mapped to human visual perception. Each person perceives the real world differently from that person's own perspective. The metaverse similarly needs to integrate and record the multitude of individual perceptions of objects in the metaverse. The objective reality is one representation of the object, but each individual may need to perceive and interact with a separate aspect of that same object, with more or less granularity (i.e., level of detail), depending on that person's focus and actions on that same object.

An improved metaverse would have a corresponding individualized local metaverse for each agent. For example, in the improved metaverse each different local metaverse need not be completely aligned and consistent with other local metaverses of other agents. In addition, these different local metaverses would be aligned and consistent only when needed. Illustrative embodiments enable a global metaverse environment that includes a plurality of different local metaverses, which illustrative embodiments coordinate and align using a lazy consistency model (e.g., provide data consistency between caches corresponding to the local metaverses of the global metaverse only when an agent performs an irreversible action on an object in the agent's local metaverse that is globally visible, which decreases the amount of data exchanged or transmitted over the network).

The global metaverse view represents the current state of objects. Illustrative embodiments update the global metaverse view only when a globally observable state change occurs in an object. However, illustrative embodiments enable an agent to perform actions on an object in a local metaverse in ways that do not change the globally visible state of that object in the global metaverse when the agent performs a reversible action on that object in the local metaverse. An agent can request the metaverse to materialize an arbitrary view of a particular object, and multiple other agents in the same scene can observe different aspects and level of detail of that object simultaneously while experiencing that object in their own local metaverses. For example, one agent experiencing an art gallery scene can view an entire painting in that agent's local metaverse, while another agent experiencing that same art gallery scene in a different local metaverse can examine a specific brush stroke of that same painting.

Illustrative embodiments optimize transmission of information to maintain the state of objects in the global metaverse. Illustrative embodiments dynamically update object fidelity in the local metaverse corresponding to an agent based on the perception and resolution (i.e., level of detail) needed by that agent to experience that object in the local metaverse. Illustrative embodiments dynamically update an object state change to the global metaverse based on whether the object state change performed by an agent cached in a local metaverse is globally observable or irreversible.

As an illustrative example, a retailer corresponds to a metaverse that presents a virtual retail store. The virtual retail store includes multiple objects (e.g., shirts) hanging on a clothing rack. When a shopper (e.g., an agent representing the shopper in the metaverse) picks up a shirt off the clothing rack to, for example, try the shirt on in a virtual fitting room, the count of shirts on the clothing rack may go to zero. For example, multiple agents may examine the shirts displayed on the clothing rack, but in actuality only one shirt is available for purchase. However, the retailer may not want to show the clothing rack as being empty to the other agents representing other shoppers in the metaverse because the agent that is trying on the shirt may decide not to purchase the shirt. In other words, until an agent commits to purchasing the shirt (i.e., performs an irreversible action on the object), the state of the shirt can remain ambiguous in the metaverse. The retailer may show the clothing rack as being empty in the metaverse only when the shirt is purchased, and no other shirt inventory remains in the physical real world store of the retailer. Thus, illustrative embodiments do not need to keep the state of the clothing rack, as seen by different agents, consistent in the metaverse. The retailer may create a rule or policy that indicates to illustrative embodiments which agent actions (e.g., shirt purchases) are irreversible and need global consistency in the metaverse and which agent actions are reversible (e.g., taking shirts off the clothing rack, but placing the shirts back on the clothing rack after inspection) and do not need global consistency in the metaverse. Illustrative embodiments provide each of the agents in the global metaverse store with an individual local metaverse store, which illustrative embodiments only synchronize state of each individual local metaverse store in the global metaverse store when one of the agents performs some irreversible action on an object (e.g., purchases the shirt). It should be noted that the entity (e.g., enterprise, business, company, organization, institution, agency, or the like) corresponding to the metaverse creates the rules or policies that define which agent actions are irreversible and which agent actions are reversible.

As another illustrative example, a mining company corresponds to a metaverse that trains workers on mining and extraction procedures. One agent representing a worker in the mining company metaverse invokes an extraction procedure that crushes rock salt and extracts pure sodium chloride. However, modeling material at a molecular level or separating elements of a compound is a computationally expensive process in a metaverse. In this illustrative example, when the agent representing the worker invokes that particular extraction procedure in the mining company metaverse, illustrative embodiments do not perform the computationally expensive process of transforming state of the crushed rock salt to the pure sodium chloride state in the global metaverse until the worker's agent in a local metaverse starts examining the pure sodium chloride in detail (i.e., resulting in an irreversible action being performed by the agent). By deferring the attainment of consistency between the local metaverse of the worker and other local metaverses of other workers in the global metaverse, illustrative embodiments attain significant performance increases by not propagating all object state changes, which occur within local metaverses, globally until an object state change is irreversible or is globally observable. The performance increases include, for example, decreased computational resource utilization, decreased bandwidth utilization, decreased network communication, and the like.

The information in a particular scene of the metaverse and the fidelity of the objects in that particular scene depends on the vantage point of an agent experiencing those objects. As used herein, fidelity of an object means that illustrative embodiments provide the level of detailed information needed (i.e., the appropriate quantity and quality of characteristics, features, attributes, traits, qualities, properties, and the like of the object to provide) for an agent to experience that particular object from a given vantage point in the metaverse. However, it should be noted that the concept of fidelity is not solely limited to proximity and visualization. Fidelity is any sense or perception, and the object fidelity will adapt to all interaction with and perception of the agent. For example, if illustrative embodiments need to differentiate dust on the shoulder of a jacket for the agent of the user to brush off in the local metaverse, then illustrative embodiments perform that differentiation. As another example, if illustrative embodiments need to differentiate NaCl molecules from raw salt for chemical extraction, then illustrative embodiments can perform that differentiation as well in the local metaverse. As a further example, if illustrative embodiments need to differentiate cake ingredients transforming to cake dough and then transforming to a baked cake, then illustrative embodiments can perform those transformations as well in the local metaverse. In other words, fidelity includes the object representing whatever is needed by the agent of the user for the interaction.

Illustrative embodiments also propose that fidelity depends on action performed by the agent. However, not necessarily at the visual depiction level, but the representation of the object within the local metaverse. For example, the object is a clothed human until the agent takes action that distinguishes a shirt as distinct from the rest of the clothing. The object is a shirt until the agent takes action that distinguishes a button or thread. Furthermore, illustrative embodiments to not instantiate fidelity of haptics until the agent touches the object. Moreover, illustrative embodiments do not instantiate olifactics until the agent smells the object. Also, if the agent combines ingredients in the local metaverse into cake dough, illustrative embodiments change the fidelity to cake dough. If the cake dough is baked in the local metaverse, then illustrative embodiments change the fidelity to a baked cake in the local metaverse. The object is a single object until the agent takes action that requires subdivision of the object. If the action is reversible, then illustrative embodiments can recombine the objects when the agent no longer needs the representation. Thus, the symbolic fidelity of the object increases or decreases based on the needs of the agent in the local metaverse.

When the agent performs an action, which is a local and reversible action, on that particular object in the scene of the agent's local metaverse, illustrative embodiments will not propagate that reversible action to the global metaverse. In addition, when the agent is no longer experiencing that particular object in the scene, illustrative embodiments roll-back (i.e., discard or delete) the state changes to the agent's local metaverse corresponding to the reversible action on that particular object from the cache associated with the agent's local metaverse. If the agent performs an irreversible action on an object in the scene, illustrative embodiments propagate or share the state of the agent's local metaverse with other local metaverses of other agents present in that same scene within the global metaverse. However, it should be noted that individual agents present in the same scene can act independently of each other in corresponding local metaverses without illustrative embodiments propagating any local object state changes globally when reversible or not globally observable. Thus, illustrative embodiments allow speculative actions in a local metaverse view while avoiding global communication and serialization with the global metaverse.

It should be noted that the concept of lazy data consistency across a plurality of memory (e.g., cache) structures is found in other contexts in computer science. For example, cache coherence protocols, such as the MOSI (modified, owned, shared, invalid) cache coherence protocol, the MESI (modified, exclusive, shared, invalid) cache coherence protocol, the MSI (modified, shared, invalid) cache coherence protocol, and the like, are utilized to copy on write in virtual machine implementations.

Memory coherence affects computer systems in which two or more processors or cores share a common area of memory. A memory system is coherent if any read of a data item returns the most recently written value of that data item. Memory coherence defines requirements for the observed behavior of reads and writes to the same memory location, and all processors should agree on the order of reads and writes to the memory location. However, it is possible for two or more processors working at the same time to simultaneously access the same memory location. If one of the processors changes or updates data in that memory location, then the other processors may be working on an out-of-date copy of the data, which resides in their local caches. Consequently, a memory coherence protocol is needed to notify all the processors of the change.

Although illustrative embodiments utilize one or more of these cache coherence protocols to maintain data consistency across a plurality of memory structures (i.e., caches) corresponding to a plurality of different local metaverses in the global metaverse, the application of these cache coherency protocols by illustrative embodiments in the context of the global metaverse is novel because of the differences in the context of the plurality of local metaverses within the global metaverse. For example, when applying these cache coherence protocols in the context of the global metaverse, data consistency across memory structures is more complex because illustrative embodiments are dealing with object state changes in a plurality of local metaverses as opposed to simple value comparisons. Determining whether the state of an object has changed based on comparison is more complex, and is dependent on the context of the action or operation performed by an agent on the object. For example, illustrative embodiments need to dynamically determine the level of detail (i.e., fidelity) of an object being experienced by an agent based on the vantage point of the agent experiencing the object, any state change in the object based on an action performed by the agent on the object, whether the action causing the state change in the object is irreversible or not, and whether to propagate the state change in the object across the plurality of local metaverses. In other words, illustrative embodiments loan the object to the agent in a shared global state within the agent's local metaverse until the agent performs an irreversible action on the object causing a change in the shared global state that must be communicated globally to the other local metaverses of the global metaverse.

Thus, illustrative embodiments provide one or more technical solutions that overcome a technical problem with an inability of current metaverses to defer attainment of data consistency in a metaverse by not propagating all object state changes. As a result, these one or more technical solutions provide a technical effect and practical application in the field of metaverses.

With reference now to FIG. 2, a diagram illustrating an example of a distributed metaverse environment is depicted in accordance with an illustrative embodiment. Distributed metaverse environment 201 may be implemented in a computing environment, such as computing environment 100 in FIG. 1. Distributed metaverse environment 201 is a system of hardware and software components for deferring the attainment of data consistency between local metaverses of a global metaverse to achieve increased system performance by not globally propagating all object state changes occurring in local metaverses until an object state change is at least one of irreversible or globally observable.

In this example, distributed metaverse environment 201 includes global metaverse 202, which is comprised of local metaverse 204, local metaverse 206, local metaverse 208, local metaverse 210, and local metaverse 212. However, it should be noted that distributed metaverse environment 201 is intended as an example only and not as a limitation on illustrative embodiments. For example, distributed metaverse environment 201 can include any number of global metaverses comprised of any number of local metaverses.

Also in this example, local metaverse 204 corresponds to agent 1 of a first user of global metaverse 202, local metaverse 206 corresponds to agent 2 of a second user of global metaverse 202, local metaverse 208 corresponds to agent 3 of a third user of global metaverse 202, local metaverse 210 corresponds to agent 4 of a fourth user of global metaverse 202, and local metaverse 212 corresponds to agent 5 of a fifth user of global metaverse 202. Thus, each respective local metaverse of global metaverse 202 corresponds to a different user who is represented by a different agent.

Further in this example, at 214, agent 1 of the first user views an object (e.g., shirt in a virtual retail store) within local metaverse 204 in high-resolution (i.e., increased fidelity) based on the vantage point of agent 1 experiencing the object (e.g., agent 1 is closely inspecting the label of the shirt with a high level of attention to discover the fabric comprising the shirt). At 216, agent 2 of the second user views the object (e.g., same shirt as agent 1) within local metaverse 206 in low-resolution (i.e., decreased fidelity) based on the vantage point of agent 2 experiencing the object (e.g., agent 2 is looking at the shirt in a mirror from a short distance while the shirt is draped on agent 2 to get a fashion sense of the shirt). Furthermore, at 218, agent 2 of the second user views the object (e.g., same shirt) in blue within local metaverse A of local metaverse 206, while at 220, agent 2 of the second user views the object (e.g., same shirt) in green within local metaverse B of local metaverse 206.

At 222, both agent 3 of the third user and agent 5 of the fifth user view the object (e.g., same shirt) together and interactively (e.g., agent 3 of the third user and agent 5 of the fifth user are taking turns holding and turning the shirt to look at the shirt from the front and the back) within local metaverse 208 and local metaverse 212, respectively. At 224, agent 4 of the fourth user performs an irreversible action on the object (e.g., agent 4 purchases that same shirt, which was the last one of that same shirt in the virtual retail store).

With reference now to FIG. 3, a diagram illustrating an example of an object synchronization process is depicted in accordance with an illustrative embodiment. Object synchronization process 300 can be implemented in a distributed metaverse environment, such as, for example, distributed metaverse environment 201 in FIG. 2. In addition, object synchronization process 300 can be implemented by a computer, such as, for example, computer 101 in FIG. 1 utilizing metaverse object synchronization code 200.

In this example, at 302, the computer determines that an agent enters a local metaverse of a global metaverse. The agent may be, for example, agent 1 of local metaverse 204 that is associated with global metaverse 202 in FIG. 2. At 304, the computer determines that an object (e.g., a shirt) exists in the global metaverse and the object is visible to the agent. At 306, the computer instantiates the object in the local metaverse at a low fidelity level based on the vantage point of the agent viewing the object. At 308, the computer detects that the agent is moving toward the object in the local metaverse for a closer inspection of the object.

At 310, the computer automatically renders the object at a higher level of fidelity showing more details of the object in the local metaverse based on the closer vantage point of the agent to the object. At 312, the computer determines that the agent is performing an irreversible action on the object (e.g., agent is purchasing the shirt) in the local metaverse causing a change in state of the shirt. At 312, the computer propagates the object state change caused by the irreversible action of the agent on the object to other local metaverses of the global metaverse. The other local metaverses can be, for example, local metaverse 206, local metaverse 208, local metaverse 210, and local metaverse 212 in FIG. 2.

Figure 4:
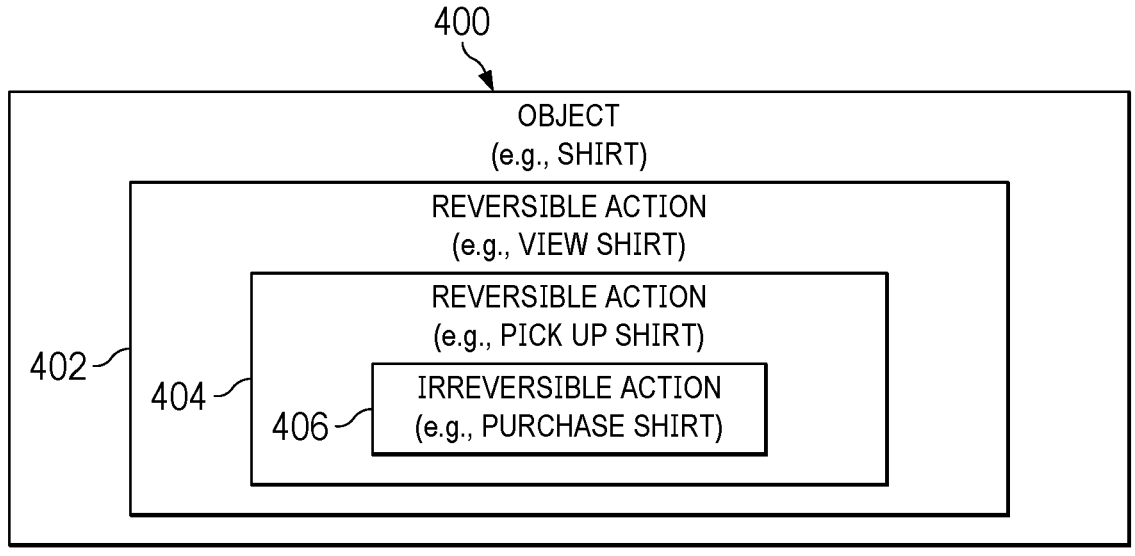
FIG. 4 is a diagram illustrating an example of actions performed on an object in accordance with an illustrative embodiment.

With reference now to FIG. 4, a diagram illustrating an example of actions performed on an object is depicted in accordance with an illustrative embodiment. Object 400 may be, for example, a shirt for sale in a virtual retail store. A computer, such as, for example, computer 101 in FIG. 1, initially presents object 400 at a lowest level of fidelity or detail in a local metaverse corresponding to an agent, such as, for example, local metaverse 204 of agent 1 in FIG. 2. In response to the computer determining, using metaverse object synchronization code that includes symbolic artificial intelligence, that the agent is experiencing object 400 in the agent's local metaverse, the computer automatically increases the level of fidelity of object 400 within the agent's local metaverse based on the vantage point of the agent experiencing object 400.

For example, at 402, the agent performs a reversible action on object 400 (e.g., the agent views and touches the shirt on a display table). Further, at 404, the agent performs another reversible action on object 400 (e.g., the agent picks up the shirt from the display table). Consequently, the computer increases the fidelity of object 400.

Afterward, at 406, the agent performs an irreversible action on object 400 (e.g., the agent purchases the shirt) causing a state change in object 400 (e.g., the shirt is no longer available for sale). In response to the agent performing the irreversible action on object 400, the computer propagates the state change in object 400 from the cache of the agent's local metaverse to caches of the other local metaverses comprising the global metaverse using a cache coherence protocol, such as, for example, MOSI cache coherence protocol, MESI cache coherence protocol, MSI cache coherence protocol, or the like. In addition, the computer can annotate object 400 as, for example, exclusive or sharable for the agent's local metaverse using one a cache coherence protocol. The other local metaverses can be, for example, local metaverse 206, local metaverse 208, local metaverse 210, and local metaverse 212 comprising global metaverse 202 in FIG. 2. It should be noted that the computer determines whether an agent action on object 400 is reversible or irreversible using, for example, policies, rules, or the like defined by the entity that owns, operates, or hosts the global metaverse.

Figure 5A:
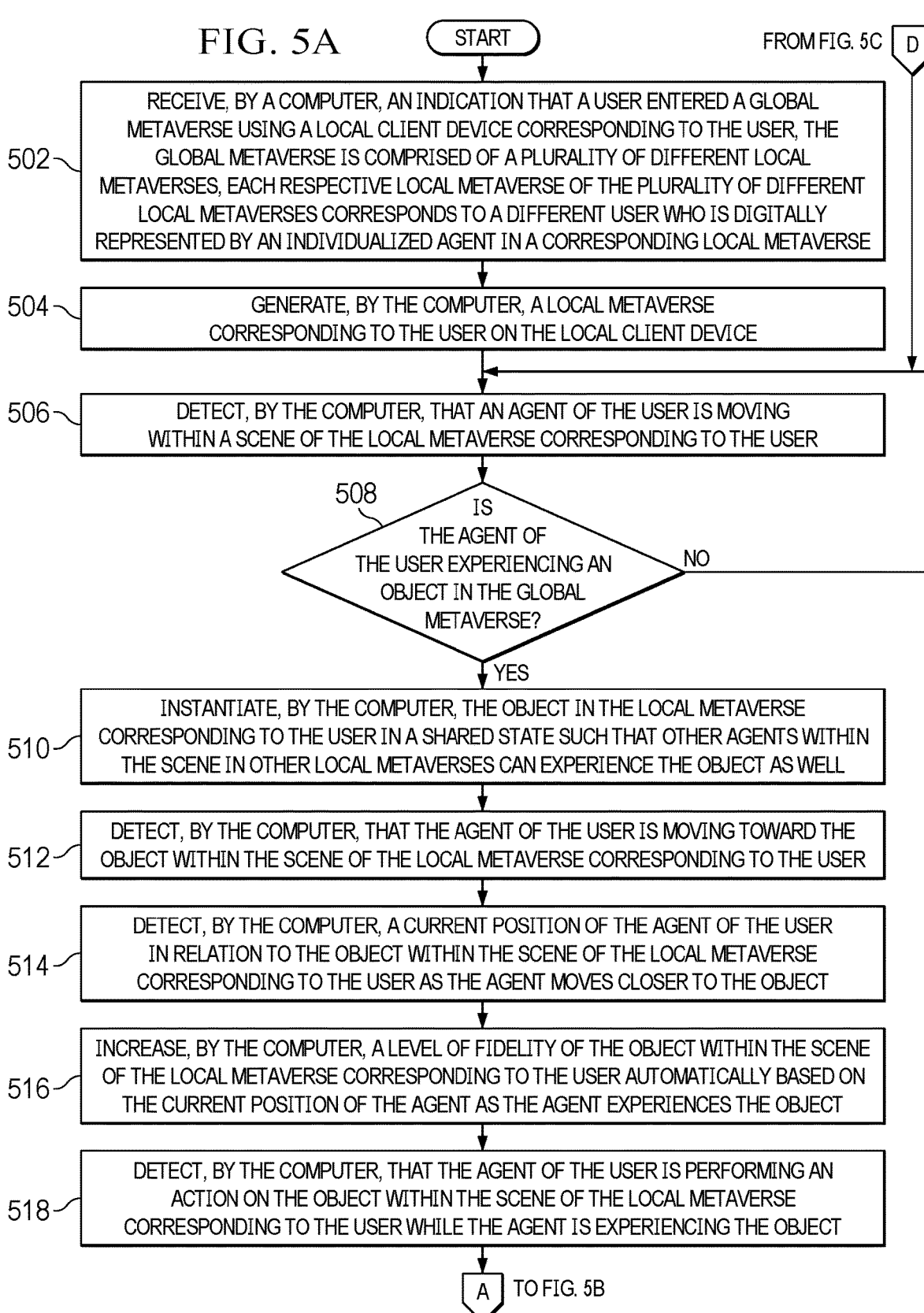
FIGS. 5A-5C are a flowchart illustrating a process for adaptive synchronization of objects in a distributed metaverse in accordance with an illustrative embodiment.
Figure 5B:
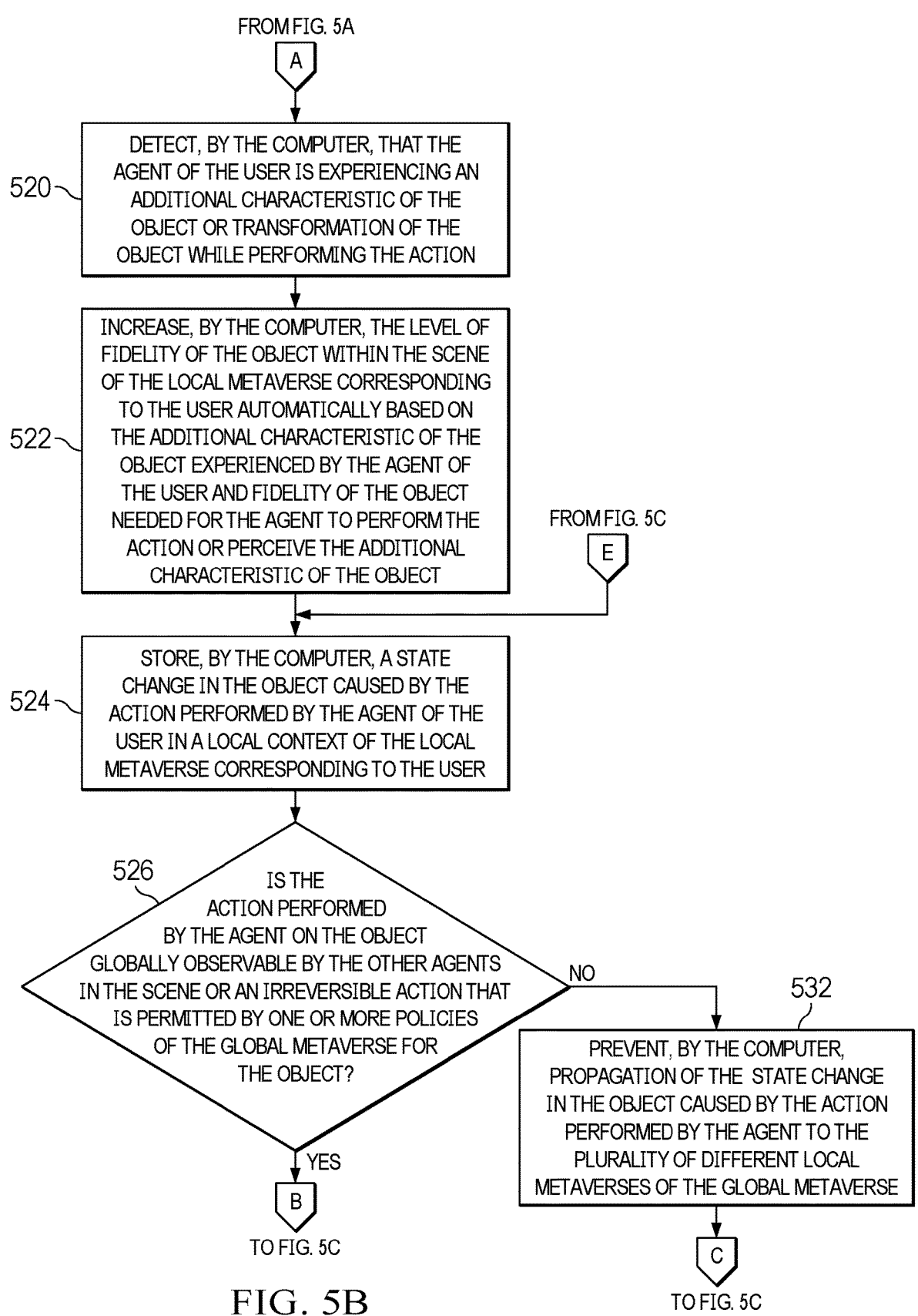
Figure 5C:
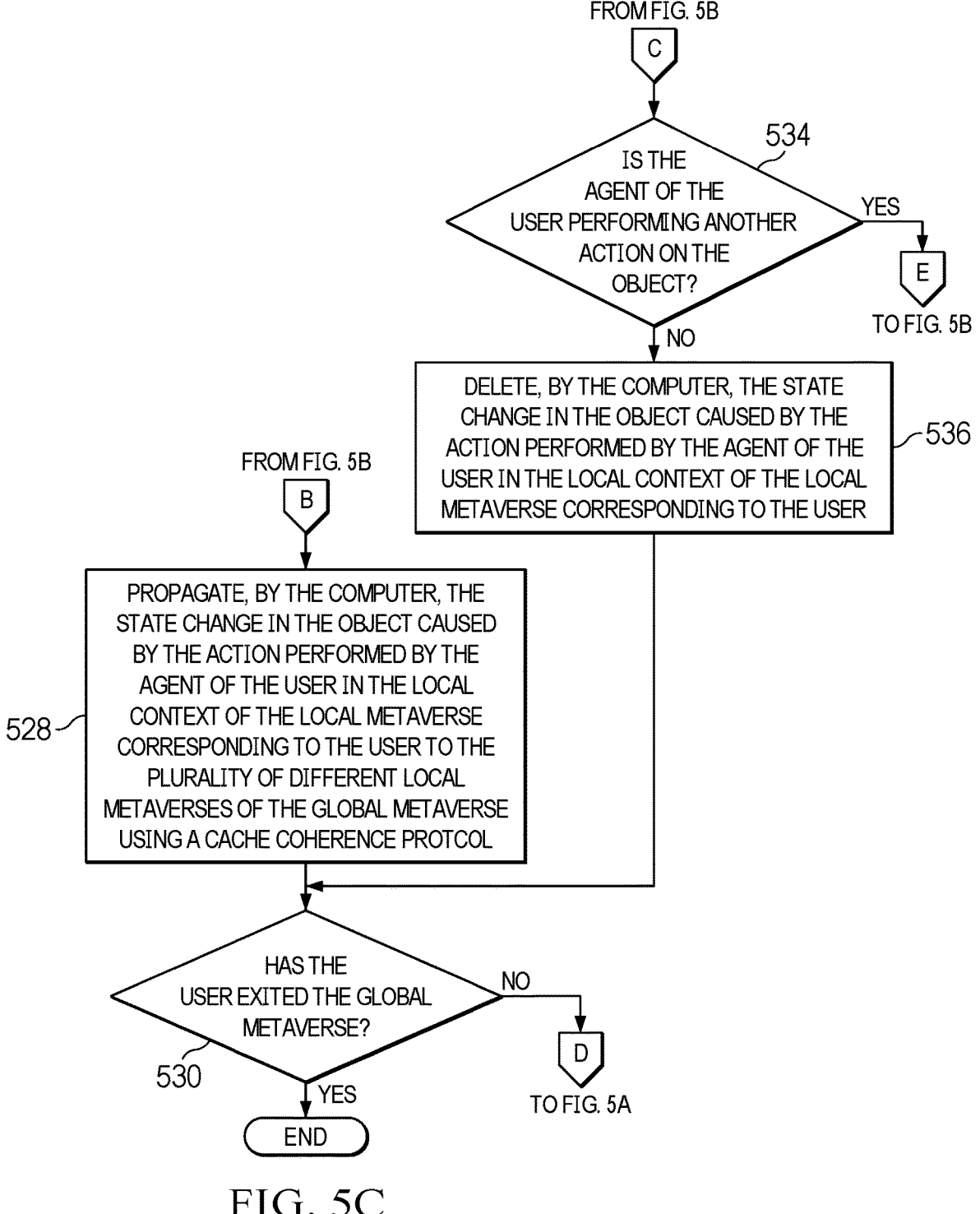

With reference now to FIGS. 5A-5C, a flowchart illustrating a process for an adaptive synchronization of objects in a distributed metaverse is shown in accordance with an illustrative embodiment. The process shown in FIGS. 5A-5C may be implemented in a computer, such as, for example, computer 101 in FIG. 1. For example, the process shown in FIGS. 5A-5C may be implemented by metaverse object synchronization code 200 in FIG. 1.

The process begins when the computer receives an indication that a user entered a global metaverse using a local client device corresponding to the user (step 502). The global metaverse is comprised of a plurality of different local metaverses. Each respective local metaverse of the plurality of different local metaverses corresponds to a different user who is digitally represented by an individualized agent in a corresponding local metaverse. In response to the user entering the global metaverse, the computer generates a local metaverse corresponding to the user on the local client device (step 504). The local metaverse corresponding to the user is one of the plurality of different local metaverses comprising the global metaverse.

Afterward, the computer detects that an agent of the user is moving within a scene of the local metaverse corresponding to the user (step 506). The computer makes a determination as to whether the agent of the user is experiencing an object in the global metaverse (step 508). If the computer determines that the agent of the user is not experiencing an object in the global metaverse, no output of step 508, then the process returns to step 506 where the computer continues to detect movement of the agent. If the computer determines that the agent of the user is experiencing an object in the global metaverse, yes output of step 508, then the computer instantiates the object in the local metaverse corresponding to the user in a shared state such that other agents within the scene in other local metaverses can experience the object as well (step 510).

Subsequently, the computer detects that the agent of the user is moving toward the object within the scene of the local metaverse corresponding to the user (step 512). In addition, the computer detects a current position of the agent of the user in relation to the object within the scene of the local metaverse corresponding to the user as the agent moves closer to the object (step 514). The computer increases a level of fidelity of the object within the scene of the local metaverse corresponding to the user automatically based on a current position of the agent as the agent experiences the object (step 516). Furthermore, the computer detects that the agent of the user is performing an action on the object within the scene of the local metaverse corresponding to the user while the agent is experiencing the object (step 518).

The computer detects that the agent of the user is experiencing an additional characteristic of the object or transformation of the object while performing the action (step 520). The computer increases the level of fidelity of the object within the scene of the local metaverse corresponding to the user automatically based on the additional characteristic of the object experienced by the agent of the user and fidelity of the object needed for the agent to perform the action or perceive the additional characteristic of the object (step 522). The computer stores a state change in the object caused by the action performed by the agent of the user in a local context of the local metaverse corresponding to the user (step 524). The computer stores the state change in the object in, for example, a cache, memory space, or the like. The computer makes a determination as to whether the action performed by the agent on the object is at least one of globally observable by the other agents in the scene or is an irreversible action that is permitted by one or more policies of the global metaverse for the object (step 526). If the computer determines that the action performed by the agent on the object is at least one of globally observable by the other agents in the scene or is an irreversible action that is permitted by one or more policies of the global metaverse for the object, yes output of step 526, then the computer propagates the state change in the object caused by the action performed by the agent of the user in the local context of the local metaverse corresponding to the user to the plurality of different local metaverses of the global metaverse using a cache coherence protocol (step 528).

Afterward, the computer makes a determination as to whether the user exited the global metaverse (step 530). If the computer determines that the user has not exited the global metaverse, no output of step 530, then the process returns to step 506 where the computer continues to detect movement of the agent. If the computer determines that the user has exited the global metaverse, yes output of step 530, then the process terminates thereafter.

Returning again to step 526, if the computer determines that the action performed by the agent on the object is not globally observable by the other agents in the scene and is not an irreversible action that is permitted by one or more policies of the global metaverse for the object, no output of step 526, then the computer prevents propagation of the state change in the object caused by the action performed by the agent to the plurality of different local metaverses of the global metaverse (step 532). Moreover, the computer makes a determination as to whether the agent of the user is performing another action on the object (step 534). If the computer determines that the agent of the user is performing another action on the object, yes output of step 534, then the process returns to step 524 where the computer stores the state change corresponding to the other action performed by the agent on the object in the local context of the local metaverse corresponding to the user. If the computer determines that the agent of the user is not performing another action on the object, no output of step 534, then the computer deletes the state change in the object caused by the action performed by the agent of the user in the local context of the local metaverse corresponding to the user (step 536). Thereafter, the process returns to step 530 where the computer determines whether the user exited the global metaverse.

Thus, illustrative embodiments of the present disclosure provide a computer-implemented method, computer system, and computer program product for deferring the attainment of data consistency between caches of a plurality of different local metaverses comprising a global metaverse to achieve increased system performance by not globally propagating all object state changes occurring in different local metaverses until an object state change is at least one of irreversible or globally observable. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computer, an indication that a user using a local client device entered a global metaverse comprised of a plurality of distributed interconnected local metaverses;
generating, by the computer, a local metaverse corresponding to the user on the local client device in response to the user entering the global metaverse, the local metaverse corresponding to the user is one of the plurality of distributed interconnected local metaverses comprising the global metaverse;
detecting, by the computer, that an agent of the user is moving within a scene of the local metaverse corresponding to the user;
detecting, by the computer, that the agent of the user of the global metaverse is performing an action on an object within the scene of the local metaverse corresponding to the user while the agent is experiencing the object;
storing, by the computer, a state change in the object caused by the action performed by the agent of the user in a local cache of the local metaverse corresponding to the user;
determining, by the computer, whether the action performed by the agent on the object is at least one of globally observable by other agents in the scene within other local metaverses or is an irreversible action that is permitted by one or more policies of the global metaverse for the object; and
propagating, by the computer, using a cache coherency protocol, the state change in the object caused by the action performed by the agent of the user in the local cache of the local metaverse corresponding to the user to caches of the plurality of distributed interconnected local metaverses of the global metaverse only in response to the computer determining that the action performed by the agent on the object is at least one of globally observable by the other agents in the scene or is the irreversible action that is permitted by the one or more policies of the global metaverse for the object to decrease resource utilization, bandwidth utilization, and network communication by not propagating the state change globally to the caches of the plurality of distributed interconnected local metaverses until the state change was globally observable or irreversible thereby increasing system performance.

2. The computer-implemented method of claim 1, further comprising:
preventing, by the computer, propagation of the state change in the object caused by the action performed by the agent of the user from the local cache of the local metaverse corresponding to the user to the caches of the plurality of distributed interconnected local metaverses of the global metaverse in response to the computer determining that the action performed by the agent on the object is not globally observable by the other agents in the scene and is not the irreversible action that is permitted by the one or more policies of the global metaverse for the object.

3. The computer-implemented method of claim 1, further comprising:
determining, by the computer, whether the agent of the user is performing another action on the object; and
deleting, by the computer, the state change in the object caused by the action performed by the agent of the user in the local cache of the local metaverse corresponding to the user in response to the computer determining that the agent of the user is not performing another action on the object.

4. The computer-implemented method of claim 1, wherein each respective local metaverse of the plurality of different distributed interconnected local metaverses corresponds to a different user who is digitally represented by an individualized agent in a corresponding local metaverse.

5. The computer-implemented method of claim 1, further comprising:
determining, by the computer, whether the agent of the user is experiencing the object in the global metaverse; and
instantiating, by the computer, the object in the local metaverse corresponding to the user in a shared state such that the other agents within the scene within the other local metaverses can experience the object as well in response to the computer determining that the agent of the user is experiencing the object in the global metaverse.

6. The computer-implemented method of claim 1, further comprising:
detecting, by the computer, that the agent of the user is moving toward the object within the scene of the local metaverse corresponding to the user;
detecting, by the computer, a current position of the agent of the user in relation to the object within the scene of the local metaverse corresponding to the user as the agent moves closer to the object; and
increasing, by the computer, a level of fidelity of the object within the scene of the local metaverse corresponding to the user automatically based on the current position of the agent as the agent experiences the object.

7. The computer-implemented method of claim 1, further comprising:

detecting, by the computer, that the agent of the user is experiencing an additional characteristic of the object or transformation of the object while performing the action; and increasing, by the computer, a level of fidelity of the object within the scene of the local metaverse corresponding to the user automatically based on the additional characteristic of the object experienced by the agent of the user and fidelity of the object needed for the agent to perform the action or perceive the additional characteristic.

8. A computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

receive an indication that a user using a local client device entered a global metaverse comprised of a plurality of distributed interconnected local metaverses;

generate a local metaverse corresponding to the user on the local client device in response to the user entering the global metaverse, the local metaverse corresponding to the user is one of the plurality of distributed interconnected local metaverses comprising the global metaverse;

detect that an agent of the user is moving within a scene of the local metaverse corresponding to the user;

detect that the agent of the user of the global metaverse is performing an action on an object within the scene of the local metaverse corresponding to the user while the agent is experiencing the object;

store a state change in the object caused by the action performed by the agent of the user in a local cache of the local metaverse corresponding to the user;

determine whether the action performed by the agent on the object is at least one of globally observable by other agents in the scene within other local metaverses or is an irreversible action that is permitted by one or more policies of the global metaverse for the object; and propagate, using a cache coherency protocol, the state change in the object caused by the action performed by the agent of the user in the local cache of the local metaverse corresponding to the user to caches of the plurality of distributed interconnected local metaverses of the global metaverse only in response to determining that the action performed by the agent on the object is at least one of globally observable by the other agents in the scene or is the irreversible action that is permitted by the one or more policies of the global metaverse for the object to decrease resource utilization, bandwidth utilization, and network communication by not propagating the state change globally to the caches of the plurality of distributed interconnected local metaverses until the state change was globally observable or irreversible thereby increasing system performance.

9. The computer system of claim 8, wherein the set of processors further executes the program instructions to:

prevent propagation of the state change in the object caused by the action performed by the agent of the user from the local cache of the local metaverse corresponding to the user to the caches of the plurality of distributed interconnected local metaverses of the global metaverse in response to determining that the action performed by the agent on the object is not globally observable by the other agents in the scene and is not the irreversible action that is permitted by the one or more policies of the global metaverse for the object.

10. The computer system of claim 8, wherein the set of processors further executes the program instructions to:

determine whether the agent of the user is performing another action on the object; and delete the state change in the object caused by the action performed by the agent of the user in the local cache of the local metaverse corresponding to the user in response determining that the agent of the user is not performing another action on the object.

11. The computer system of claim 8, wherein each respective local metaverse of the plurality of distributed interconnected local metaverses corresponds to a different user who is digitally represented by an individualized agent in a corresponding local metaverse.

12. The computer system of claim 8, wherein the set of processors further executes the program instructions to:

determine whether the agent of the user is experiencing the object in the global metaverse; and instantiate the object in the local metaverse corresponding to the user in a shared state such that the other agents within the scene within the other local metaverses can experience the object as well in response to determining that the agent of the user is experiencing the object in the global metaverse.

13. The computer system of claim 8, wherein the set of processors further executes the program instructions to:

detect that the agent of the user is moving toward the object within the scene of the local metaverse corresponding to the user;

detect a current position of the agent of the user in relation to the object within the scene of the local metaverse corresponding to the user as the agent moves closer to the object; and increase a level of fidelity of the object within the scene of the local metaverse corresponding to the user automatically based on the current position of the agent as the agent experiences the object.

14. A computer program product comprising a set of computer-readable storage media having program instructions collectively stored therein, the program instructions executable by a computer to cause the computer to:

receive an indication that a user using a local client device entered a global metaverse comprised of a plurality of distributed interconnected local metaverses;

generate a local metaverse corresponding to the user on the local client device in response to the user entering the global metaverse, the local metaverse corresponding to the user is one of the plurality of distributed interconnected local metaverses comprising the global metaverse;

detect that an agent of the user is moving within a scene of the local metaverse corresponding to the user;

detect that the agent of the user of the global metaverse is performing an action on an object within the scene of the local metaverse corresponding to the user while the agent is experiencing the object;

store a state change in the object caused by the action performed by the agent of the user in a local cache of the local metaverse corresponding to the user;

determine whether the action performed by the agent on the object is at least one of globally observable by other agents in the scene within other local metaverses or is an irreversible action that is permitted by one or more policies of the global metaverse for the object; and propagate, using a cache coherency protocol, the state change in the object caused by the action performed by the agent of the user in the local cache of the local metaverse corresponding to the user to caches of the plurality of distributed interconnected local metaverses of the global metaverse only in response to determining that the action performed by the agent on the object is at least one of globally observable by the other agents in the scene or is the irreversible action that is permitted by the one or more policies of the global metaverse for the object to decrease resource utilization, bandwidth utilization, and network communication by not propagating the state change globally to the caches of the plurality of distributed interconnected local metaverses until the state change was globally observable or irreversible thereby increasing system performance.

15. The computer program product of claim 14, wherein the program instructions further cause the computer to:

prevent propagation of the state change in the object caused by the action performed by the agent of the user from the local cache of the local metaverse corresponding to the user to the caches of the plurality of distributed interconnected local metaverses of the global metaverse in response to determining that the action performed by the agent on the object is not globally observable by the other agents in the scene and is not the irreversible action that is permitted by the one or more policies of the global metaverse for the object.

16. The computer program product of claim 14, wherein the program instructions further cause the computer to:

determine whether the agent of the user is performing another action on the object; and delete the state change in the object caused by the action performed by the agent of the user in the local cache of the local metaverse corresponding to the user in response to determining that the agent of the user is not performing another action on the object.

17. The computer program product of claim 14, wherein each respective local metaverse of the plurality of distributed interconnected local metaverses corresponds to a different user who is digitally represented by an individualized agent in a corresponding local metaverse.

18. The computer program product of claim 14, wherein the program instructions further cause the computer to:

determine whether the agent of the user is experiencing the object in the global metaverse; and instantiate the object in the local metaverse corresponding to the user in a shared state such that the other agents within the scene within the other local metaverses can experience the object as well in response to determining that the agent of the user is experiencing the object in the global metaverse.

19. The computer program product of claim 14, wherein the program instructions further cause the computer to:

detect that the agent of the user is moving toward the object within the scene of the local metaverse corresponding to the user;

detect a current position of the agent of the user in relation to the object within the scene of the local metaverse corresponding to the user as the agent moves closer to the object; and increase a level of fidelity of the object within the scene of the local metaverse corresponding to the user automatically based on the current position of the agent as the agent experiences the object.

20. The computer program product of claim 14, wherein the program instructions further cause the computer to:

detect that the agent of the user is experiencing an additional characteristic of the object or transformation of the object while performing the action; and increase a level of fidelity of the object within the scene of the local metaverse corresponding to the user automatically based on the additional characteristic of the object experienced by the agent of the user and fidelity of the object needed for the agent to perform the action or perceive the additional characteristic.

\* \* \* \* \*